(12) United States Patent
Zhou et al.

(10) Patent No.: US 6,327,388 B1
(45) Date of Patent: Dec. 4, 2001

(54) IDENTIFICATION OF LOGOS FROM DOCUMENT IMAGES

(75) Inventors: Jiangying Zhou, Columbia, SC (US); Daniel P. Lopresti, Hopewell, NJ (US); Prateek Sarkar, Briarcliff Manor, NY (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/134,143

(22) Filed: Aug. 14, 1998

(51) Int. Cl.$^7$ .................................................. G06K 9/46
(52) U.S. Cl. ........................................... 382/204; 382/203
(58) Field of Search ............................. 382/204, 205, 382/206, 219, 229, 180, 203, 209, 215, 216, 217, 218, 227, 317, 394, 296, 298

(56) References Cited

U.S. PATENT DOCUMENTS

| | | |
|---|---|---|
| 4,186,378 | 1/1980 | Moulton . |
| 4,461,028 | 7/1984 | Okubo . |
| 4,817,166 | 3/1989 | Gonzalez et al. . |
| 4,972,499 | 11/1990 | Kurosawa . |
| 5,287,275 | 2/1994 | Kimura . |
| 5,351,314 | 9/1994 | Vaezi . |
| 5,414,781 * | 5/1995 | Spitz et al. ............................ 382/296 |
| 5,436,983 * | 7/1995 | Bernzott et al. ..................... 382/229 |
| 5,438,628 * | 8/1995 | Spitz et al. ............................ 382/181 |
| 5,452,094 | 9/1995 | Ebner et al. . |
| 5,479,537 * | 12/1995 | Hamashima et al. ................ 382/592 |
| 5,555,362 | 9/1996 | Yamashita et al. . |
| 5,588,027 | 12/1996 | Wang . |
| 5,680,479 | 10/1997 | Wang et al. . |
| 5,699,453 | 12/1997 | Ozaki . |
| 5,703,962 | 12/1997 | Niki et al. . |
| 5,748,865 | 5/1998 | Yamamoto et al. . |
| 5,751,849 | 5/1998 | Ikeda . |
| 5,757,957 | 5/1998 | Tachikawa . |
| 5,767,978 | 6/1998 | Revankar et al. . |
| 5,774,579 | 6/1998 | Wang et al. . |

OTHER PUBLICATIONS

A. Lawrence Spitz, "Logotype Detection in Compressed Images using Alignment Signatures", Daimler Benz Research and Technology Center, pp. 303–310.

M.Y. Jaisimha, "Wavelet Features for Similarity based Retrieval of Logo Images", Apr. 1996, vol. 2660, pp. 89–100.

David Doermann et al., "Logo Recognition", Center for Automation Research, University of Maryland, Oct. 1993, pp. 1–28.

* cited by examiner

Primary Examiner—Andrew W. Johns
Assistant Examiner—Seyed Azarian
(74) Attorney, Agent, or Firm—Harness, Dickey & Pierce, P.L.C.

(57) ABSTRACT

The method and apparatus enables any user to search for logos in document images stored in a bitmap format. The search efficiently compares bitmap or image data by extracting a series of connected components. These connected components are grouped according to region where each region may be a potential logo. Shape and density parameters of a region are determined and compared to the parameters of the stored logo image. If a region is successfully matched then that region is aligned and scaled to the corresponding stored logo image. Thereafter, a bitwise comparison is then performed between the scaled and aligned region and the logo image. A match score is assigned to each region along with other pertinent information about the region, and is stored in a ranked logo list database. The ranked logo list database represents a list of logos found in the document image.

22 Claims, 8 Drawing Sheets

Before Rotation  After Rotation

IDENTIFICATION OF LOGOS FROM DOCUMENT IMAGES

BACKGROUND AND SUMMARY OF THE INVENTION

The present invention relates generally to image analysis and electronic information identification. More particularly, the invention relates to a computerized system for locating and identifying logos in document images.

In this information age, we are constantly bombarded with electronic files and information. Some call this the information explosion. Much of this information derives from image-based systems that generate bitmapped images. To help cope with the information explosion we need many tools, including ones to distinguish electronic files and documents based on information contained in bitmapped images.

Image-based systems present a major challenge to information retrieval because the data is difficult to search. Whereas information retrieval technology is fairly well advanced in coded character-based systems, these retrieval techniques do not work in image-based systems. That is because image-based systems store information as bitmap data that correspond to the appearance of the printed page and not the information content of that page. Traditional techniques require the conversion of bitmap data into text data, through optical character recognition (OCR) software, before information retrieval systems can go to work. Unfortunately, optical character recognition software is computationally expensive, and the recognition process is rather slow.

In addition, often important information may be encoded graphically, in a form that cannot be readily converted into text. Corporate logos represent an important example of such information. While some corporate logos do include letters that can be converted using OCR, many do not. It would therefore be quite helpful to be able to identify logos, regardless of whether they contain recognizable letters, to allow the computer to search and retrieve information based on the presence of the logo. This would allow one to organize documents and files by logo, if desired. Organizing information on this basis can be quite helpful, even if character-based organization is also possible.

For example, suppose a user wanted to locate any document received from ABC Corporation. Normally this would be performed as a text search for the letters "ABC", and this text search would yield any three letters "ABC" that are connected together as a single entity. However, if ABC Corporation uses a highly stylized logo instead of easily recognizable letters, the text search technique may be of little value. Conversely, such a text search would also uncover other instances of the letters "ABC," possibly having nothing to do with a document received from ABC corporation. A text search would also retrieve newspaper articles about ABC corporation, for example. In this example a logo search would be highly desirable. It could locate the document of interest without the foregoing problems.

The present invention recognizes that there will be vast amounts of data that are in bitmap or image format, and that users will want to search this information, just as they now search text-based systems. Instead of converting the entire document from image format to text format, the present invention analyzes the bitmap data in its native format, to extract regions within the image data that correspond to the most likely candidates for logos. The invention recognizes that the logos may be in any position in the document and at different skew angles. The invention scans the document, seeking a bitmap that is similar to the bitmap of the logo in question.

In accordance with the invention, a document image is matched with a database of logo images stored in a computer readable memory as a logo bit pattern and as predefined sets of parameters. The predefined sets of parameters are indicative of shape and mean density. Connected component analysis is performed on the bit pattern of a document image to identify a plurality of regions of connected components in the document image and to generate region parameter data that include parameters indicative of shape and mean density.

The parameters of a document region are compared with the parameters of a database of logo images to identify a plurality of logo match candidates. The document regions are then scaled and aligned to correspond to the size and skew of the logo match candidates. The result of the document regions being scaled and aligned is to create a number of adjusted regions that also have corresponding adjusted bit patterns. A bitwise comparison is performed between the adjusted bit patterns with their corresponding adjusted regions and the bit patterns of the logo match candidates to select a best match and store the best match selections in a ranked logo list database.

For a more complete understanding of the invention, reference may be had to the following specification and to the accompanying drawings.

DETAILED DESCRIPTION OF THE PREFERRED EMBODIMENT

Figure 1:
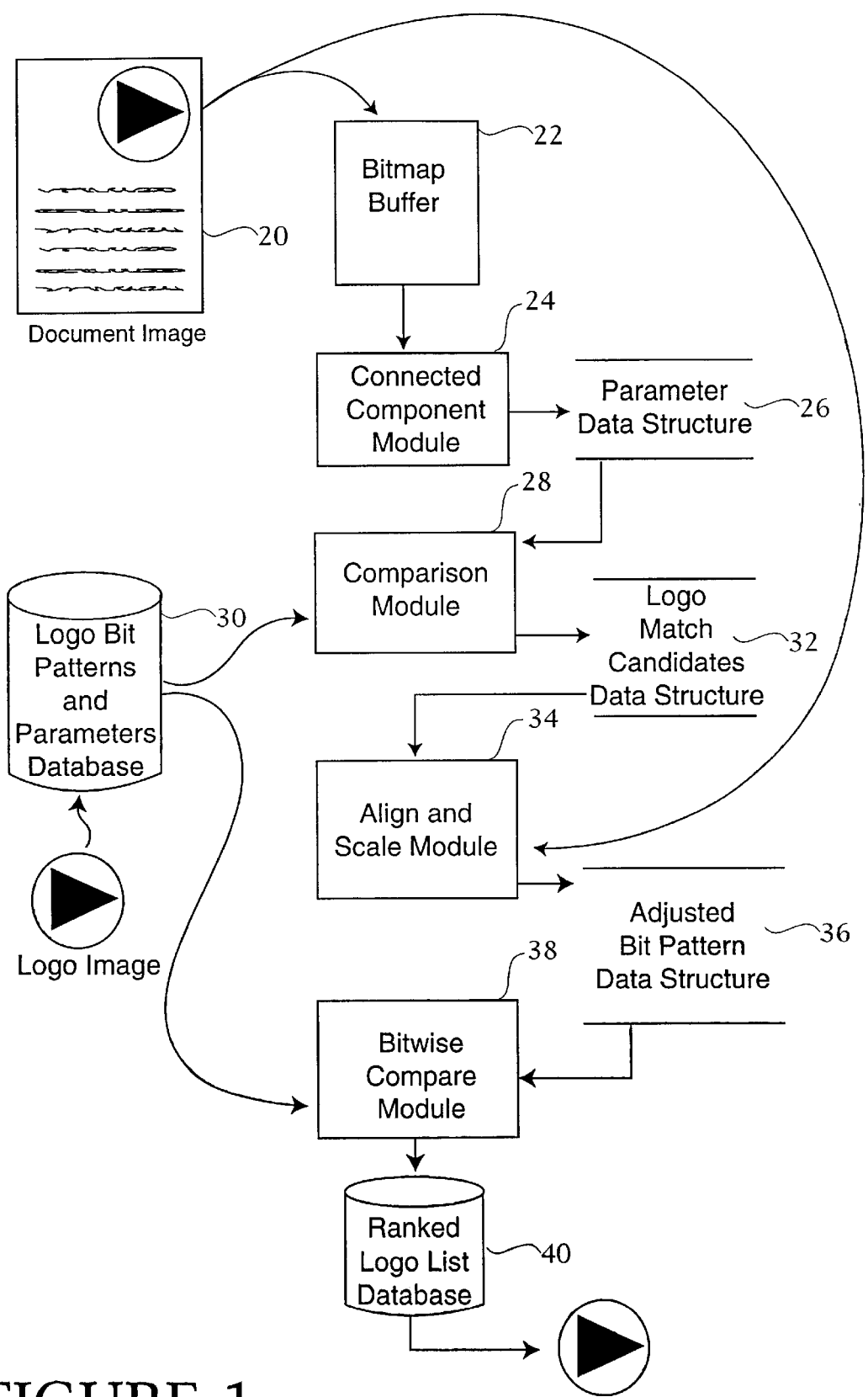
FIG. 1 is a software block diagram of the presently preferred embodiment of the invention.

Referring now to FIG. 1, an overall software block diagram of an entire logo recognition system in accordance with the preferred embodiment of the present invention is shown. This particular system is designed to input a document image in the form of a bitmap and utilizing a logo image in the form of bit pattern and parameter data in the logo database it is designed to search for a logo in the document image and if there is a match it is suppose to identify and rank each adjusted document region according to their matched scores. Generally, the overall system comprises a document image bitmap 20, a bitmap buffer 22, a connected component module 24, a parameter data structure 26, a comparison module 28, a logo bit pattern and parameter database 30, a logo match candidate data structure 32, an align and scale module 34, a adjusted bit pattern data structure 36, a bitwise compare module 38, and a ranked logo list database 40.

Referring to FIG. 1, a document image 20 stored as a bit pattern in a bitmap buffer 22 such that individual black or white pixels of the image are stored as binary numbers. The document image can come from a wide variety of sources including optical scanners, fax machines, copiers, graphics software, video data, world wide web pages and the like.

The processor of the computer system on which the invention is implemented maintains a bitmap buffer 22 within the random access memory of the computer system. The bitmap buffer 22 is preferably of a size sufficient to hold all of the bitmap data associated with a given page or image. If desired, the bitmap buffer 22 can be made larger, to hold multiple pages. In general, the size of the bitmap buffer 22 will depend upon the resolution of the image. Each individual picture element or pixel is stored in a separate memory location within the buffer 22.

Regarding the bit pattern data, the present description will describe the invention in the context of black and white image data. In other words, for purposes of this description, the bitmap buffer 22 data comprises simple binary data representing black and white dots or pixels that make up the overall image. Of course, the techniques described herein can be readily extended to other forms of image data, including multiple bit grayscale data and multiple bit color data. Binary black and white data is used here to simplify the explanation, and illustrate one possible configuration.

The computer implemented software system employs a group of processing modules, each designed to perform different data manipulation functions. These processing modules have been illustrated in FIG. 1 by enclosed rectangles. These modules operate upon data stored in memory according to predefined data structures that will be described more fully below. In FIG. 1 the data structures have been illustrated using open-ended rectangles, to distinguish them from the processing modules. Also, to aid in understanding the invention, the processing modules of the invention have been arranged in FIG. 1 in a top down order, showing the sequence in which various modules are placed in service.

Figure 2:
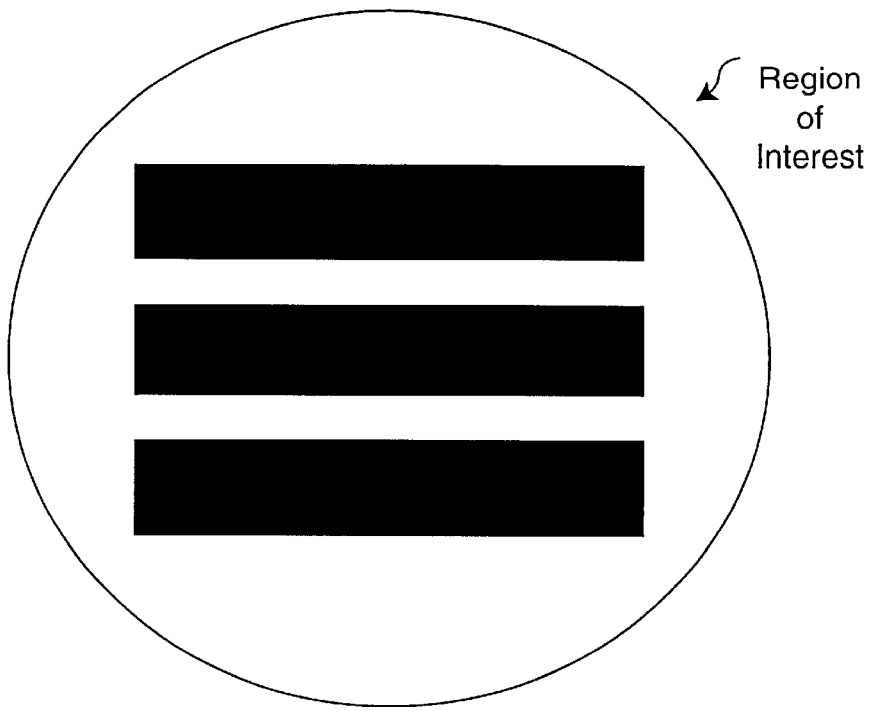
FIG. 2 is an enlarged sample view of three separate connected components.

First, a connected component extraction process is performed by module 24 upon the document image bitmap pattern in the bitmap buffer 22. This connected component extraction process essentially populates the connected component data structure 26 that is used to store much of the geometric data associated with the bitmap image. A connected component in a binary image is a maximal set of touching black pixels. Essentially, the connected component extraction process starts with a given data element within a bitmap buffer 22 and analyzes the adjacent data elements to determine whether they comprise a part of a connected component, as the black dots that make up a rectangle are all connected together. Refer to FIG. 2 for an example. Note that there are three rectangles in the region in FIG. 2. Each rectangle is made up of a collection of connected black dots. The connected component analysis will consider each rectangle a separate connected component.

In the preferred embodiment the connected component analysis is performed in a raster-scan fashion whereby contiguous black pixels lying in the same horizontal line are treated as a single unit, called a segment. The connected component is in turn made up of one or more of such segments and may therefore be expressed as a linked list of segments.

Figure 3:
FIG. 3 is a diagram of the connected component data structure used by the presently preferred embodiment.

The connected component extraction module 24 identifies individual connected components and identifies and extracts various geometric features that are used by other modules later within the program. FIG. 3 graphically shows the configuration of connected component data structure 26. Referring to FIG. 3, the connected component data structure 26 maintains a record of the number of geometric features for each connected component. These features include: the location, width and height of the bounding box that defines the connected component, area of component, aspect ratio, and mean density. Mean density is the ratio of the number of black pixels of the component to the number of pixels in the bounding box. A bounding box is defined as the minimum rectangle enclosing a connected component. The presently preferred embodiment eliminates, from further analyses, connected components which are comparable or smaller in size than 10 point text.

The connected component data structure 26 is essentially configured as a list, with each connected component being represented as a separate element in the list belonging to a particular region, refer to FIG. 3. In the presently preferred embodiment a region represents a linked list of all components that are at a detected minimal distance from the component's neighbor. The distance between neighbors is measured as the minimum distance between the sides of the bounding boxes of the connected components. Essentially, a region is a potential logo that must be verified through further analyses.

After the data structure 26 has been populated by the connected component extraction process 24 the comparison module 28 is then called upon to operate on the data in the parameter data structure 26 and the parameter data of the logo image database 30. For each region, in the parameter data structure 26, the comparison module 28 will arrange each connected component in decreasing order of area. The comparison module 28 then pairs a connected component of the region with a connected component of the logo image. The aspect ratio and the mean density of the logo connected component is compared to the aspect ratio and the mean density of the document region connected component.

Aspect ratios computed from different images of a pattern may vary within a close range owing to a sampling variation, skew and a host of other printing and scanning imperfections. Therefore, in order to decide whether aspect ratios of two bounding boxes are close enough to warrant further matching of the connected components, we have to set an allowable range of variation. The above motivates the following procedure.

Figure 5:
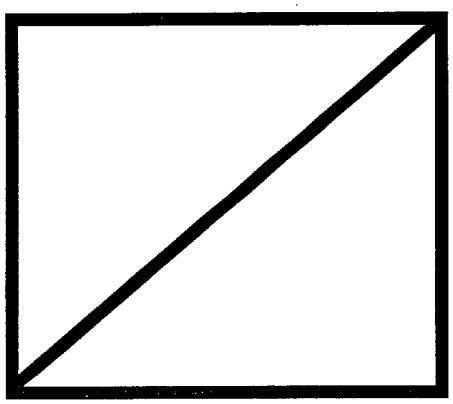
FIG. 5 is a diagram illustrating the minimum and maximum limits to the aspect ratio of the presently preferred embodiment of the invention.
Figure 5:
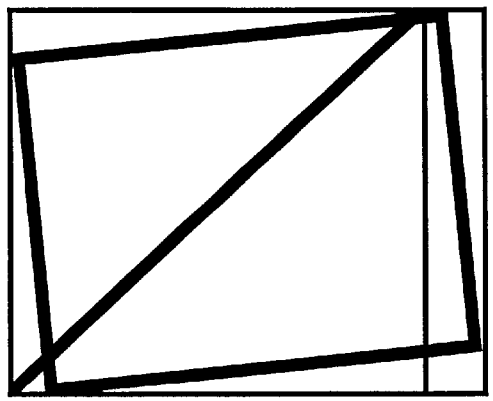

Since the logo image in the logo image database has no skew by assumption, the comparison module starts with the bounding box of the logo image. The next step rotates the diagonal of the box through ±2.5° and obtains the maximum and minimum limits to the aspect ratio, see FIG. 5. If the aspect ratio of the connected component of the document region falls within the above limits then the aspect ratios are considered matched. If the aspect ratio and the mean density of the connected components of a region from the document image 20 match the aspect ratio and mean density of the connected components from the logo image bitmap 30 then we store the logo bit pattern and its associated parameters with the document region and its associated parameters in a logo matched candidate data structure 32.

After the logo match candidate data structure 32 has been populated, by the comparison module 28, the align and scale module 34 is called upon to operate on the data in the data structure 32. The align and scale module 34 is responsible to ensure that each logo match candidate is aligned and scaled relative to the logo bit pattern stored in the logo image bitmap database 30. When logos are printed at different sizes a scaling factor needs to be used to size one logo relative to the other. Since logos are scaled uniformly in all directions the scaling factor between two different matching components can be estimated using one of the following:

1. the ratio of widths of their bounding boxes, $s_w$
2. the ratio of heights of their bounding boxes, $S_h$
3. the square root of the ratio of the number of black pixels in each component, $s_a$ When one component is a scaled version of the other, all three methods should give equal estimates. However, images may be thinned or thickened around the edges due to ink spread or improper setting of threshold during digitization. When the images are thinned or thickened around the edges the three methods do not give equal results if used separately. This observation motivated a heuristic correction scheme for the scale estimates. The scaling factor for sizing a logo match candidate is then calculated as $S=s_w+s_h-s_a$. The scaling factor is then applied to the bit pattern of the document region so that the resulting scale of the adjusted bit pattern of the document region matches that of the logo match candidate.

Figure 4:
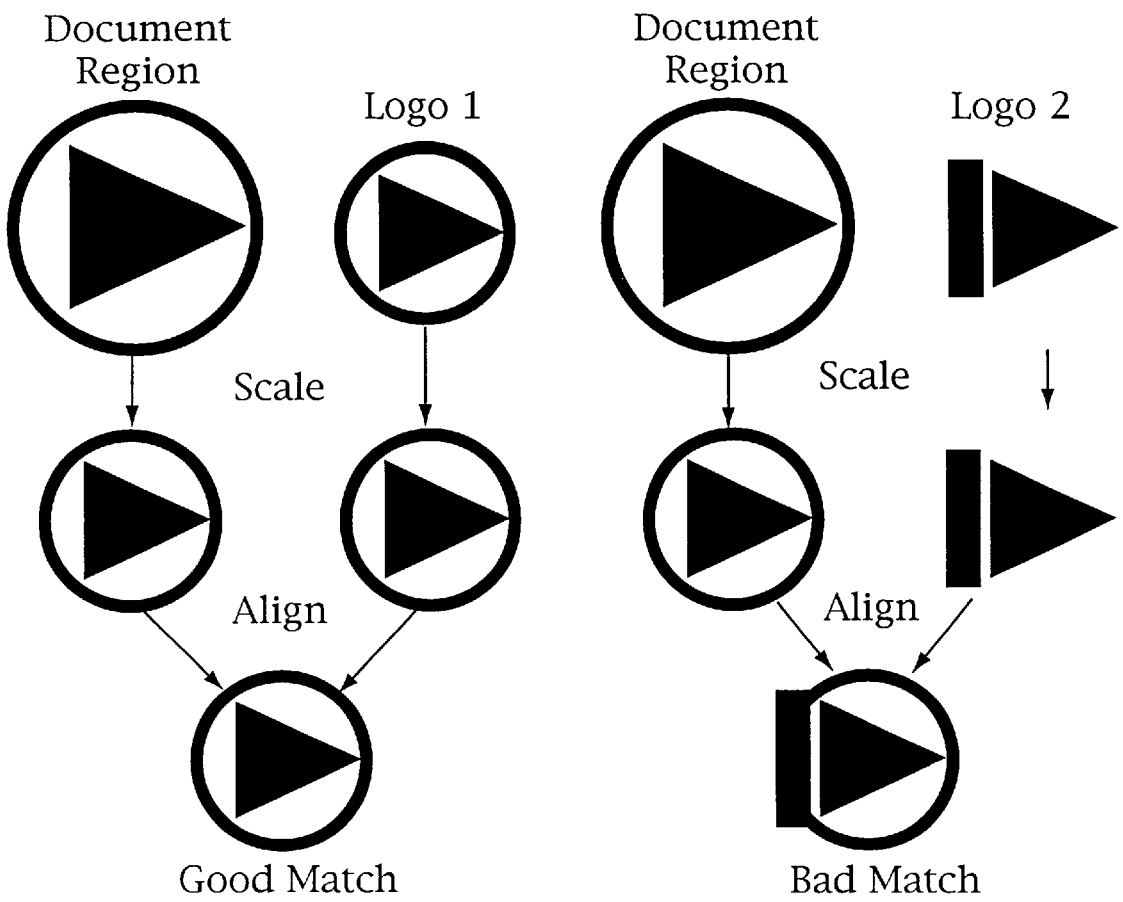
FIG. 4 is an illustration of scaling and aligning of logos.

For aligning, the bit pattern of the document region is anchored to a reference point relative to that of the logo match candidate. FIG. 4 illustrates how the scaling and aligning process takes place. After the scaling and aligning of the document image region associated with the logo candidate the resultant adjusted bit pattern of the adjusted document image region is stored in the adjusted bit pattern data structure 36.

Figure 6A:
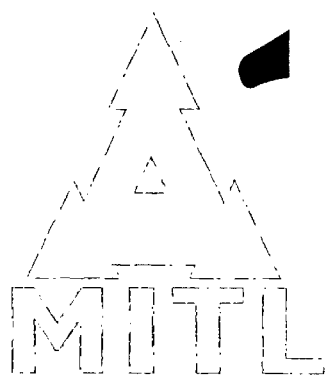
FIG. 6A illustrates the difference image that results from the mathematical combination of the bits of FIGS. 6B and 6C.
Figure 6B:
Figure 6C:

In the next step, the bitwise comparison module 38 treats the logo bit pattern from the logo bit pattern database 30 as a template and examines how well the template matches the adjusted bit pattern of the document region from the adjusted bit pattern data structure 36 at the specified alignment. The bitwise comparison module 38 treats the logo bit pattern as the template and examines how well the template matches the adjusted bit pattern of the document region at the specified alignment. In the preferred embodiment a bitwise exclusive-or operation is performed between the two bit patterns yielding a difference image. Each non-zero pixel in the difference image represents a point where the colors of the logo bit pattern 30 and the document image 20 are different. In other words, each non-zero pixel corresponds to a pixel mismatch. A large number of mismatch pixels thus indicates a bad match. FIG. 6 shows a difference image, refer to FIG. 6A, between the region of a document image, refer to FIG. 6B, and a logo image, refer to FIG. 6C.

Figure 7A:
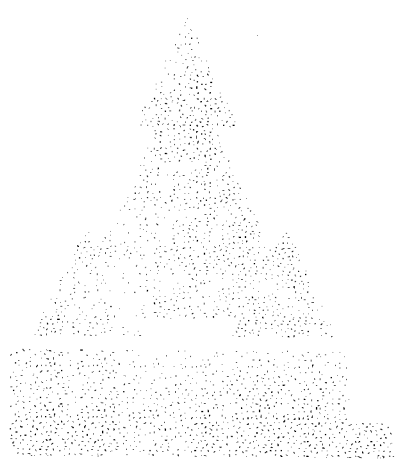
FIG. 7A is an illustration of the region of interest for its corresponding FIG. 7B logo image.
Figure 7B:

A mismatch score is then calculated. In the current embodiment, the mismatch score is computed only in the "region-of-interest." In the preferred embodiment, a mismatch score is computed for each region of interest. In the preferred embodiment we define the region of interest as the region between the outermost black pixels of the outermost logo edges plus a fixed-width buffer region, refer to FIG. 7A. This is based on the understanding that logos are printed to be visually conspicuous and readily recognizable. If the logo is printed along with several extraneous black components intruding into its territory it becomes more difficult to distinguish the logo. An illustration of the region of interest concept is in referring to FIG. 6A where the difference image in FIG. 6A returns a good match because the jutting tip of the extraneous component lies outside the region of interest and therefore does not contribute to the mismatch score.

Since logos and match regions can vary in size, it is necessary to normalize the mismatch count. In the preferred embodiment the match count is defined as:

match score=1−(mismatch count)/(number of pixels in the region of interest)

So for each document image region that is fed into the bitwise compare module 38 from the adjusted bit pattern data structure 36 a score is generated corresponding to the respective match count. In the preferred embodiment a threshold match score is used to discard match scores that are too low. Also generated for each adjusted document image region are the coordinates of the matching region on the page, and the number of pixels that are matched. The above set of match score, coordinates, and number of pixels are associated with their adjusted document image region and are stored in a ranked logo list database 40.

From the foregoing it will be understood that the invention analyzes a document image for logo patterns and returns a ranked list of logos, each with a match score that reflects the systems' confidence in the match. The invention matches logo images to document images by using connected component analysis, and subsequent data processing operations. A logo recognition system can be used for at least two classes of tasks. Given the document image the task may be to identify and recognize logos in the image. We shall call this the problem of document annotation. On the other hand, given a logo image we may have to find all documents in the database with the same logo on it. We can call this the problem of document retrieval.

Figure 8:
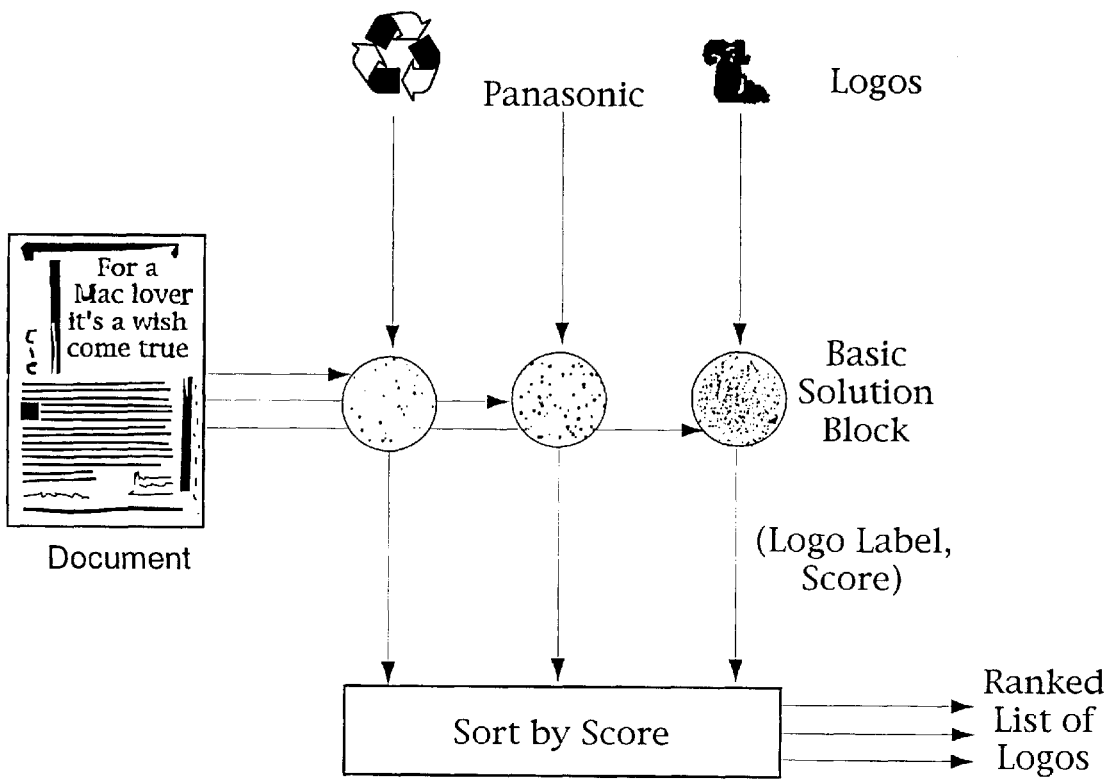
FIG. 8 is an illustration of using the invention to identify all logos within a document image.
Figure 9:
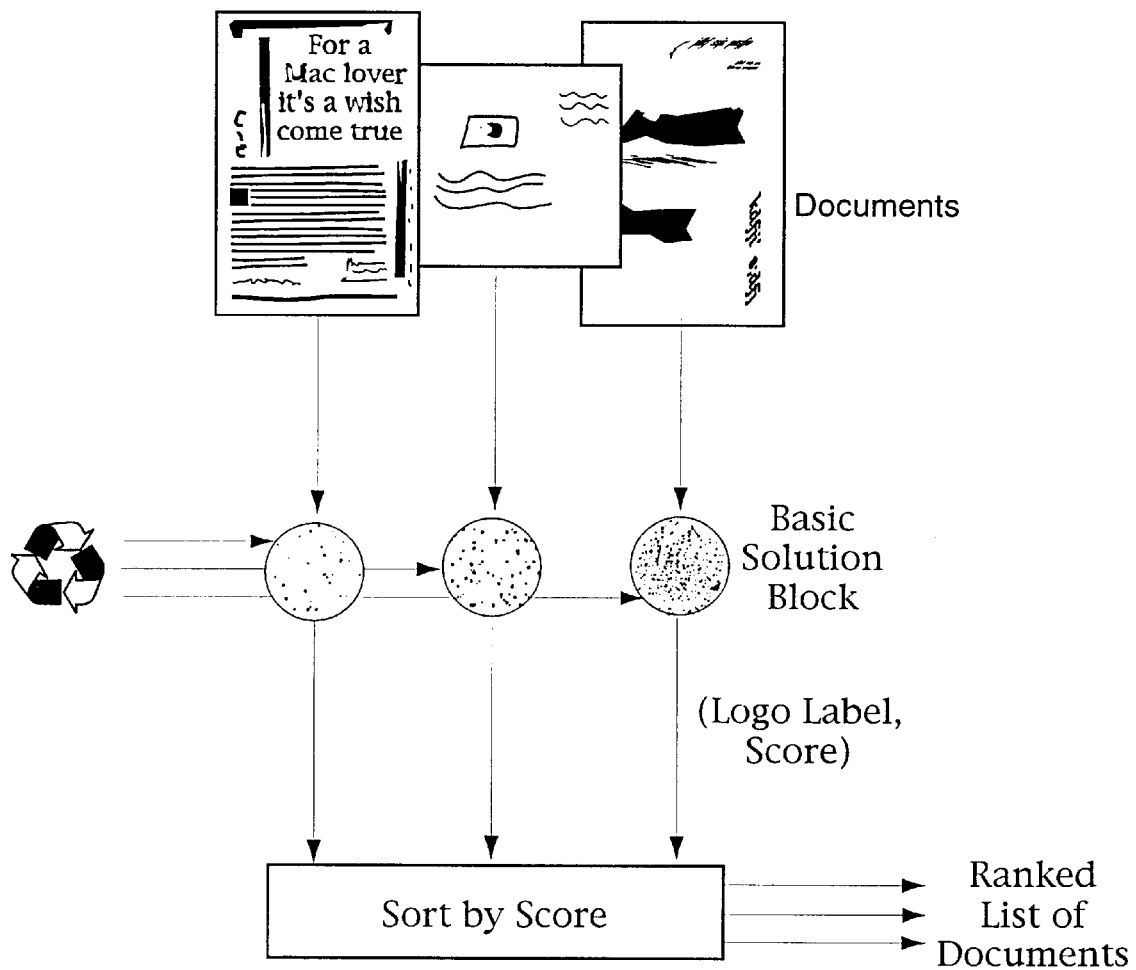
FIG. 9 is an illustration of using the invention to locate all documents in a database that contain the same logo.

To illustrate the invention in operation, consider the examples illustrated in FIGS. 8 and 9. FIG. 8 illustrates using the invention to identify a logo within a document image. FIG. 9 illustrates using the invention to locate all documents in a database that contain the same logo. Logo images are stored in a computer-readable memory as a logo bit pattern and as a predefined set of parameters. The document image is stored in a bitmap buffer. This document image is stored in the form of a bitmap pattern.

The system processes the document image by finding the black components in each document image via the connected component module. For each black connected component that is found, the connected component module calculates features such as location, height and width of each component's bounding box and the area or number of black pixels in the component. Furthermore, the connected component module also calculates the aspect ratio and mean density of each connected component.

The connected components are then grouped according to region. The connected components belong to the same region if each connected component is within a set distance from any other connected component in that same region. The connected components and their corresponding parameters are then stored in a parameter data structure where each member is grouped according to region.

Following the connected component analysis, a comparison module then compares the connected components and their corresponding parameters from the parameter data structure to the predefined logo connected components and its corresponding predefined parameters that are stored in the logo image database. For each region, the connected components are then arranged in decreasing order of area. Pairs of connected components are then picked, one each from the predefined logo and the document region.

If there is a good match of aspect ratios and the mean densities between the connected components of a document region and a predefined logo then we store the logo bit pattern and its associated parameters with the document region and its associated parameters in a logo matched candidate data structure.

Since the document region can be a different size than the logo match candidate, the bit pattern from the document region must be adjusted to match the scale of the logo match candidate. Similarly, since the bit pattern of the document region may be aligned differently than the logo match candidate, the bit pattern from the document region must be adjusted to match the alignment of the logo match candidate. For the bit pattern from the document region a scaling factor is estimated and applied to the bit pattern of the document region so that the resulting scale of the bit pattern of the document region matches that of the logo match candidate. Then, the bit pattern of the document region is anchored to match the alignment of the logo match candidate.

After the bit pattern of the document region is scaled and aligned the resultant adjusted bit pattern of the document region and the connected components of the document region are stored in an adjusted bit pattern data structure.

Thereafter, a bitwise comparison module treats the logo match candidate from the logo match candidate database as a template and examines how well the template matches the adjusted bit pattern of the document region at the specified alignment. The two images are first aligned as specified and a logical bitwise operation is performed to yield a difference image. Each non-zero pixel in the difference image represents a point where the colors of the logo and the document images are different. In other words, each non-zero pixel corresponds to a pixel mismatch. A high number of mismatched pixels thus indicates a bad match. If desired, further refinement of the analysis can be performed by creating a region of interest around a specified zone inside the template thereby reducing false pixel mismatches.

A match score is calculated based on the number of mismatches that the comparison creates. The match score is used to create a ranked logo list where for any given document image a list of all the logos found on the document are listed.

While the invention has been described in its presently preferred embodiment, it will be understood that the invention is capable of certain modifications without departing from the spirit of the invention as set forth in the appended claims.

What is claimed is:

1. A method for matching a bit pattern of a document image with a database of logo images stored in a computer readable memory as a logo bit pattern and as a predefined sets of parameters including parameters indicative of the shape and mean density of each logo image, comprising the steps of:

performing connected component analysis on the bit pattern of said document image to identify at least one region of connected components within said document image and to generate for said region parameter data that includes a parameter indicative of shape and a parameter indicative of mean density;

comparing said parameters of said region with said parameters of said database of logo images to identify a plurality of logo match candidates having associated logo bit patterns as stored in said database;

scaling and aligning at least one said region to correspond to the size and skew of said logo match candidates and to thereby generate a plurality of adjusted regions having corresponding adjusted bit patterns such that the resulting scale of the adjusted bit pattern matches that of the logo match candidates; and performing a bitwise comparison between the adjusted bit patterns of said adjusted region and the bit patterns of said logo match candidates to select the best match and store said best match selections in a ranked logo list database.

2. The method of claim 1 wherein said region is further defined by a minimum predetermined distance separating each said connected component.

3. The method of claim 1 wherein said connected components of said region of said document further include a predetermined minimum size.

4. The method of claim 1 wherein said region parameter data further includes location, height, width and area of said connected component.

5. The method of claim 1 further comprising arranging each connected component by decreasing order of area.

6. The method of claim 1 wherein said comparison of said parameters of said region and said parameters of said database of logo images further include comparing at least one parameter indicative of aspect ratio and said parameter indicative of mean density.

7. The method of claim 1 further comprising a scaling factor for sizing said logo match candidates.

8. The method of claim 7 wherein said scaling factor corresponds to a calculation utilizing the ratio of widths of said region, the ratio of heights of said region, and the square root of the ratio of the number of black pixels in said connected component.

9. The method of claim 1 further including a region of interest within a fixed area that encompasses the outermost black pixels of said logo image so that said adjusted region corresponds to said region of interest.

10. The method of claim 1 wherein said best match corresponds to a calculation utilizing the mismatch count and the number of pixels in said region of interest.

11. The method of claim 10 wherein said best match further includes a predetermined minimum threshold score.

12. An apparatus for locating and identifying logos on document images, comprising:

a computer readable memory for storing a database of logo images so that said database consists of a logo bit pattern and a predefined set of parameters;

a bitmap buffer for storing said document images so that said bitmap buffer consists of at least one bit pattern of said document image;

a connected component module connected to said bitmap buffer for identifying at least one region of connected components within said document image and to generate for said region parameter data that includes a parameter indicative of shape and a parameter indicative of mean density;

a comparison module connected to said parameter data and said database of log images for comparing said parameters of said region with said database of logo images to identify a plurality of logo match candidates having associated log bit patterns as stored in said database;

a scale and align module connected to said plurality of logo match candidates and said parameter data bit patterns for scaling and aligning said at least one region to correspond to the size and skew of said logo match candidates and to thereby generate a plurality of adjusted regions having corresponding bit patterns such that the resulting scale of the adjusted bit pattern matches that of the logo match candidates; and a bitwise comparison connected to said adjusted bit pattern data and said logo match candidates for performing a bitwise comparison between the adjusted bit patterns of said adjusted region and the bit patterns of said logo match candidates to select the best match.

13. The apparatus of claim 1 wherein said region is further defined by a minimum predetermined distance separating each said connected component.

14. The apparatus of claim 1 wherein said connected components of said region of said document further include a predetermined minimum size.

15. The apparatus of claim 1 wherein said region parameter data further includes location, height, width and area of said connected component.

16. The apparatus of claim 1 further comprising arranging said connected components and said region parameter data associated with said connected components by decreasing order of area.

17. The apparatus of claim 1 wherein said comparison of said parameters of said region and said parameters of said database of logo images further includes at least one parameter indicative of aspect ratio and said parameter indicative of mean density.

18. The apparatus of claim 1 further comprising a scale factor for sizing said logo match candidates.

19. The apparatus of claim 18 wherein said scale factor corresponds to a calculation utilizing the ratio of widths of said region, the ratio of heights of said region, and the square root of the ratio of the number of black pixels in said connected component.

20. The apparatus of claim 1 further including a region of interest within a fixed area that encompasses the outermost black pixels of said logo image so that said adjusted region corresponds to said region of interest.

21. The apparatus of claim 1 wherein said best match corresponds to a calculation utilizing the mismatch count and the number of pixels in said region of interest.

22. The apparatus of claim 21 wherein said best match further includes a predetermined minimum threshold score.

* * * * *

UNITED STATES PATENT AND TRADEMARK OFFICE
CERTIFICATE OF CORRECTION

PATENT NO. : 6,327,388 B1
DATED : December 4, 2001
INVENTOR(S) : Jiangying Zhou et al.

It is certified that error appears in the above-identified patent and that said Letters Patent is hereby corrected as shown below:

Title page,
Item [56] under References Cited, U.S. PATENT DOCUMENT "5,588,027" should be -- 5,588,072 --

Column 8,
Line 47, "log" should be -- logo --.
Line 50, "log" should be -- logo --.

Signed and Sealed this

Twenty-eighth Day of May, 2002

Attest:

JAMES E. ROGAN
*Attesting Officer*     *Director of the United States Patent and Trademark Office*